UNITED STATES PATENT OFFICE.

ALADÁR von LÁSZLOFFY, OF PEORIA, ILLINOIS.

MANUFACTURE OF BY-PRODUCTS FROM DISTILLERY-SLOP.

1,193,951.                    Specification of Letters Patent.     Patented Aug. 8, 1916.

No Drawing.              Application filed March 27, 1911. Serial No. 617,026.

*To all whom it may concern:*

Be it known that I, ALADÁR VON LÁSZLOFFY, a citizen of Hungary, residing at Peoria, in the county of Peoria and State of Illinois, have invented certain new and useful Improvements in the Manufacture of By-Products from Distillery-Slop; and I do hereby declare that the following is a full, clear, and exact description of the invention, which will enable others skilled in the art to which it appertains to make and use the same.

This invention relates to a process of manufacturing byproducts from distillery slop or vinasses of every description including concentrated solutions of byproducts obtained from distillery slop, including, also, slop from which water has been removed.

One of the objects of the invention is to provide a new and useful process by which a variety of byproducts such as glycerin, organic acids and fats can be obtained from distillery slop.

Another object is to extract byproducts from distillery slop without destroying the value of the residue of extraction as a feed and without wasting other products contained in the slop.

Still another object is to obtain byproducts of greater purity and better quality than by any known method.

A still further object is to simplify the manufacture of the byproducts and the separation of the same into components and to make the manufacture of said byproducts more economical than by any known method.

Another object is to provide a new method of purifying and separating the mixture of byproducts obtained from distillery slop into its components.

One of the most valuable substances contained in distillery slop is glycerin and in order to extract it from the slop the latter has been treated with alcohol as has been described in my former application for patent for the manufacture of byproducts from distillery slop filed January 30th 1911 under Serial Number 605,611. Glycerin is easily soluble in alcohol or mixtures containing a large proportion of alcohol, as described in the application referred to, but the glycerin extracted from slop with the aid of alcohol is very impure because many other substances are dissolved together with the glycerin which are undesirable and are difficult to eliminate afterward.

I have found that such solvents as have a high dissolving power for fats, but do not mix with glycerin, can also be used for the extraction of glycerin if the extraction is continued long enough. Such solvents are for instance ethyl ether, chloroform, tetrachlorid of carbon, acetone, benzol, hydrocarbons, carbon disulfid and like solvents. These typical fat-solvents have heretofore been considered unfit for the extraction of glycerin because they do not mix with it, having only a very small dissolving power for the same. I have found that in their relation to different solvents the organic acids contained in the slop occupy an intermediate position between the fat-dissolving solvent and the glycerin. This is especially true of the lactic acid. I have found that the presence of organic acids, especially lactic acid, in the solvent increases the power of the same for dissolving glycerin, the lactic acid acting as a "mediator" between the glycerin and the solvent. I have further found that the power of these solvents for dissolving glycerin can be increased by the addition of a small amount of an alcohol, that is 5 to 10% ethyl alcohol or methyl alcohol, for example. In applying this principle to the different solvents I have found that the most of them having a high dissolving power for fat, but which do not mix with glycerin, or their mixtures can be used for the extraction of glycerin from the distillery-slop and therefore I do not confine myself particularly to the use of the solvents especially enumerated since I believe that the use of any fat solvent which does not mix with glycerin for the extraction of glycerin, organic acids and fat from distillery-slop is new. In order to simplify the explanation of my invention I will use the generic term "fat-solvents" meaning the fat-solvents enumerated, or other fat-solvents which do not mix with glycerin, mixtures of the fat-solvents, or mixtures of the same with a small amount of an alcohol or a small amount of organic acid. Preferably I use ethyl-ether containing 4 to 10% of alcohol which fat-solvent I have found to be the most favorable for the carrying out of my invention.

In my former application above referred to I describe a process of extracting byproducts such as glycerin, organic acids and fat from distillery-slop with the aid of alcohol or mixtures of alcohol with ether, chloroform, tetrachlorid of carbon and other such mixtures in which alcohol predominates. And also therein I have disclosed a process by which the organic acids and the fats can be extracted with the aid of such solvents as dissolve fat and organic acids but do not dissolve glycerin, the glycerin being afterward extracted with alcohol solvents.

The present invention makes it possible to extract fat, organic acids and glycerin in one operation and with the aid of the same solvent and to single out and separate the individual products in a very simple way. The extraction of the glycerin with the aid of fat solvents is slower than with the aid of alcohol or mixtures containing a large proportion of alcohol, but the glycerin and the other products obtained are of very great purity. The greater purity of the products and the simplicity of operation makes this process superior in economy to the process of extracting glycerin and other byproducts from distillery slop with the aid of alcohol.

As already stated my former application is for a process of extracting byproducts from distillery slop with the aid of alcohol or mixtures of the same with other substances and in that application I have described methods of preparing the slop for the extraction with alcohol solvents and also methods of separating the solution of byproducts into its components. The preferred mode of preparing the slop for the extraction, in my patent application referred to, consisted in evaporating the slop or its liquid part to a syrupy consistency, then treating the resulting syrupy slop with the solvent. In said application a method of increasing the amount of lactic acid naturally present in the slop was described. This consisted in subjecting the slop, or preferably the liquid part thereof, before concentrating the same, to a lactic acid fermentation, with or without the addition of a small percentage of carbohydrates. This increases the output of lactic acid without materially adding to the cost of manufacture. In the present process the increase of the amount of lactic acid contained in the slop is especially advantageous as the extraction of the glycerin is facilitated by the presence of lactic acid, as already explained. I can use all of the preparatory steps described in said application with the present extracting process and I can also use the methods therein described for the separation of the byproducts into their components. I have, however, devised new and original methods for the preparing of the slop for the extraction and for the separation of the mixture of byproducts into its components, which are especially advantageous in carrying out the present invention.

In order to make the slop accessible to the solvents I remove the largest part of the water from the same by evaporating and drying or with the aid of such agents as will physically or chemically absorb the water. I have found that if the slop is dried at a high temperature the organic acids, especially the lactic acid, are partially transformed into other substances and the yield of such organic acids considerably lowered. Therefore, I not only concentrate but also dry the slop preferably in vacuum on a vacuum drier, but the removal of the water from the slop may take place in any stage of the manufacturing process.

The byproducts can be extracted with fat solvents either from the whole slop or a part thereof and said part may be separated from the slop either by physical or chemical means. Thus the slop can be separated by filtering, settling or centrifugal force into a solid and a liquid part and I can concentrate or dry them separately and extract the two parts separately or extract the mixtures of the two parts. I can also separate the slop into a concentrated solution of byproducts and into a residue for instance with the aid of alcohol and then treat the concentrated solution of byproducts with the fat solvents. Or, the slop can be concentrated and separated by osmosis or dialysis into two parts and the dialyzed slop treated, after concentration, with fat solvents. The slop also can be treated alone with fat solvents or, in order to make the slop more accessible to the solvents I can spread the same over a large surface by mixing it with other substances. These substances may be organic or inorganic substances of any description such, for example, as gypsum, clay, bran, turf, saw-dust, dried sugar-beet pulp, cottonseed hulls, etc.

I have found that the process of extraction can be made more profitable if such substances are used as absorbents for the concentrated slop which themselves contain other valuable substances which can be extracted with the same solvent with which the slop is treated. Such substances are the various oilseeds, corn germs, or other oilmeals, from which a part of the fat has been removed by pressing, hominy feed, etc. The mixtures of the slop or concentrated slop with the absorbents may be further dried preferably at a low temperature, the mixture of the slop with the absorbent taking place in any stage of the manufacturing process.

In order to simplify and make clear my invention in the further explanation thereof and in the claims in using the term "slop" or "distillery slop" I mean slop of every description including dried slop and parts of the slop which have been separated from other parts by physical or chemical means and mixtures of such slop with absorbents.

It will be seen that various methods can be used for preparing the slop for the extraction with the solvent by the present process, and I do not confine myself to any of the methods described.

In treating the slop, any style of mixing or percolating apparatus suitable for this purpose can be used and the process of extraction can be made a continuous one. The solvents may be used either hot or cold at ordinary atmospheric pressure or at a pressure different from the atmosphere.

The solution resulting from the treatment of the slop with the solvent is evaporated and the solvent reused for the treatment preferably in the known way of extracting fat in a fat extraction apparatus in which the solution is continuously boiled, the solvent vapor condensing and passed through the slop repeatedly until the latter is exhausted. By evaporating the solvent, condensing the vapor of the same and passing the condensed vapor through the slop repeatedly the solution gets more and more concentrated and I have found that the glycerin which is but little soluble in the fat solvents gradually drops out of the solution and forms a separate layer while the organic acids remain longer in solution and also the fat which is the easiest soluble in said solvents and this property I utilize for separating the glycerin from the other substances. When ether is used as a solvent, by preference, the succinic acid stays long in solution together with the lactic acid and the fat. By evaporating the solution the succinic acid crystallizes and can be separated from the remaining solution and finally the solvent is completely evaporated. Now, the fat separates from the lactic acid, two layers being formed, which I draw off separately.

The following is an example of how the process can be carried out practically:—
The slop coming from the distilling apparatus is filtered on a filter press. The filtered thin slop is run into a receiver and allowed to sour. After the souring the thin slop is concentrated on a vacuum evaporator to the consistency of a thick syrup. This concentrated slop is mixed with corn oilmeal in the proportion of about one part concentrated slop and two parts corn oilmeal, cottonseed meal, or linseed meal and the mixture dried at a low temperature on a vacuum drier. After the drying the mixture is ground and placed in an apparatus similar in construction to that used for the extraction of fat with solvents. This apparatus consists of a cylinder for the material to be extracted, a kettle in which the solvent is distilled and a reflux cooler which condenses the solvent vapor which afterward percolates through the material to be extracted and flows back into the kettle. In the kettle of this apparatus is placed ethyl ether containing about 5% of alcohol. The ether is boiled and kept boiling, the vapor of which passes into the reflux cooler, the condensed solvent constantly percolating through the slop oilmeal mixture and during this percolating process the ether dissolves the fat, the organic acids and glycerin. The solution runs into the kettle, the solvent is partially evaporated and thus the solution becomes more and more concentrated, the percolation continuing until the material is exhausted. The glycerin which is but little soluble in ether containing the 5% alcohol, and which does not mix with the same, accumulates on the bottom of the kettle, forming a separate layer which can be drawn off separately from the layer containing the ether solution of fat and organic acids. This solution is now further concentrated by evaporating part of the ether. This will cause the succinic acid to crystallize and the crystals may be separated from the remainder of the solution. The ether is now completely driven off, thereby liberating the lactic acid and the fat which form separate layers and can be drawn off separately. The ether left in the slop oilmeal mixtures is driven out with the aid of steam and is recovered. The ether contained in the glycerin, and the organic acids and fat are also recovered by evaporating and condensing the vapor.

The advantages of the process described in this application, over the older ones, are that a plurality of valuable by-products is recovered from distillery-slop in a state of high purity and of a purity such as is not obtained by any older process, and it provides a way of singling out and separating the individual products and the manner of so doing is simple, efficient and commercially practical. No chemicals are added to the slop and the residue of extraction is left in a perfect conditoin as a concentrated cattle-feed.

In thus bringing out my invention, I desire to make it understood that it fully contemplates the use of any substances that may be the equivalent of those described in producing the results described herein, and the utilization, also, of such steps in the process as may produce finally the results sought, and it also contemplates the extraction from such slops as contain mere traces of fat, for instance, molasses and wine slops.

Having thus described my invention I claim:

1. The process of extracting a solution containing lactic acid, succinic acid and glycerin from a mixture of substances derived from distillery slop consisting in treating said mixture with a solvent capable of dissolving lactic acid and having but a small solvent action on glycerin, whereby the lactic acid, succinic acid and glycerin are dissolved, separating the solution resulting from this treatment from the insoluble part, and separating the products so extracted from each other by utilizing the difference in the solubility of the same in said solvent.

2. The process of recovering lactic acid, succinic acid, glycerin and fat from a mixture of substances derived from distillery-slop consisting in treating said mixture with a solvent capable of dissolving lactic acid and having but a small solvent action on glycerin, whereby the lactic acid, succinic acid and glycerin are dissolved, separating the solution resulting from this treatment from the insoluble part and singling out from this solution lactic acid, succinic acid, glycerin and fat, by utilizing the difference in the solubility of the named products in a solvent of the nature characterized herein.

3. The process of recovering lactic acid, succinic acid, glycerin and fat from a mixture of substances derived from distillery-slop consisting in treating said mixture with a solvent capable of dissolving lactic acid and having but a small solvent action on glycerin whereby the lactic acid, succinic acid and glycerin are dissolved, separating the solution resulting from this treatment from the insoluble part and singling out from this solution lactic acid, succinic acid, glycerin and fat, by utilizing the difference in the solubility of the named products in said solvent.

4. The process of recovering lactic acid, succinic acid, glycerin and fat from distillery-slop which consists in removing water from the slop, afterward treating said slop with a solvent capable of dissolving lactic acid and having but a small solvent action on glycerin, whereby the lactic acid, succinic acid and glycerin are dissolved, separating the solution resulting from this treatment from the insoluble part, and separating the lactic acid, succinic acid, glycerin and fat so extracted from one another by utilizing the difference in the solubility of the same in said solvent.

5. The process of recovering lactic acid, succinic acid, glycerin and fat from distillery-slop which consists in separating the slop into a solid part and into a liquid part, removing water from the liquid part, afterward treating the latter with a solvent capable of dissolving lactic acid and having but a small solvent action on glycerin, whereby the lactic acid, succinic acid and glycerin are dissolved, separating the solution resulting from this treatment from the insoluble part, and separating the lactic acid, succinic acid, glycerin and fat so extracted from one another by utilizing the difference in the solubility of the same in said solvent.

6. The process of recovering lactic acid, succinic acid, glycerin and fat from a mixture of substances derived from distillery-slop consisting in combining said mixture of substances with absorbent material, afterward treating the combined substances with a solvent capable of dissolving lactic acid and having but a small solvent action on glycerin, whereby the lactic acid, succinic acid and glycerin are dissolved, separating the solution resulting from this treatment from the insoluble part; and separating the lactic acid, succinic acid, glycerin and fat so extracted from one another by utilizing the difference in the solubility of the same in said solvent.

7. The process of recovering lactic acid, succinic acid, glycerin and fat from a mixture of substances derived from distillery-slop consisting in combining said mixture of substances with a material that contains fats in an absorbed state, afterward treating the combined substances with a solvent capable of dissolving lactic acid and having but a small solvent action on glycerin, whereby the lactic acid, succinic acid and glycerin are dissolved, separating the solution resulting from this treatment from the insoluble part and separating the lactic acid, succinic acid, glycerin and fat from one another by utilizing the difference in the solubility of the same in said solvent.

8. The process of recovering lactic acid, succinic acid, glycerin and fat from a mixture of substances derived from distillery-slop, consisting in treating said mixture in a continuous manner with a solvent capable of dissolving lactic acid and having but a small solvent action on glycerin, whereby the lactic acid, succinic acid and glycerin are dissolved, separating the solution resulting from this treatment from the insoluble part, and separating the lactic acid, succinic acid, glycerin and fat so extracted from one another by utilizing the difference in the solubility of the same in said solvent.

9. In the process of recovering lactic acid, succinic acid, glycerin and fat from a mixture of substances derived from distillery-slop, the process which consists in treating said mixture with a solvent capable of dissolving lactic acid and having but a small solvent action on glycerin, whereby the lactic acid, succinic acid and glycerin are dissolved, separating the solution resulting from this treatment from the insoluble part, concentrating the solution to oversaturate it with glycerin, and separating the glycerin from the remaining solution.

10. In the process of recovering lactic acid, succinic acid, glycerin and fat from a mixture of substances derived from distillery-slop, the process which consists in treating said mixture with a solvent capable of dissolving lactic acid and having but a small solvent action on glycerin, whereby the lactic acid, succinic acid and glycerin are dissolved, separating the solution resulting from this treatment from the insoluble part, concentrating the solution thereby causing the succinic acid to crystallize, and separating the crystals from the remaining liquid.

11. In the process of recovering lactic acid, succinic acid and glycerin from a mixture of substances derived from distillery-slop, the process which consists in treating said mixture with a solvent capable of dissolving lactic acid and having but a small solvent action on glycerin, whereby the lactic acid, succinic acid and glycerin are dissolved, separating the solution resulting from this treatment from the insoluble part, concentrating the solution thereby oversaturating it with glycerin, separating the glycerin from the solution, continuing the concentration thereby causing the succinic acid to crystallize, and separating the crystals from the remaining liquid.

12. The process of recovering lactic acid, succinic acid, glycerin and fat from a mixture of substances derived from distillery-slop, consisting in subjecting said mixture to lactic acid fermentation, removing water from the same, treating the mixture with a solvent capable of dissolving lactic acid and having but a small solvent action on glycerin, whereby the lactic acid, succinic acid and glycerin are dissolved, separating the solution resulting from this treatment from the insoluble part and separating the lactic acid, succinic acid and glycerin and fat so extracted from one another by the difference in the solubility of the same.

In testimony whereof I affix my signature, in presence of two witnesses.

ALADÁR von LÁSZLOFFY.

Witnesses:
W. I. SLEMMONS,
L. M. THURLOW.